March 1, 1966  S. E. HEGEDUS  3,237,305
ORTHODONTIC APPLIANCE
Filed May 22, 1963
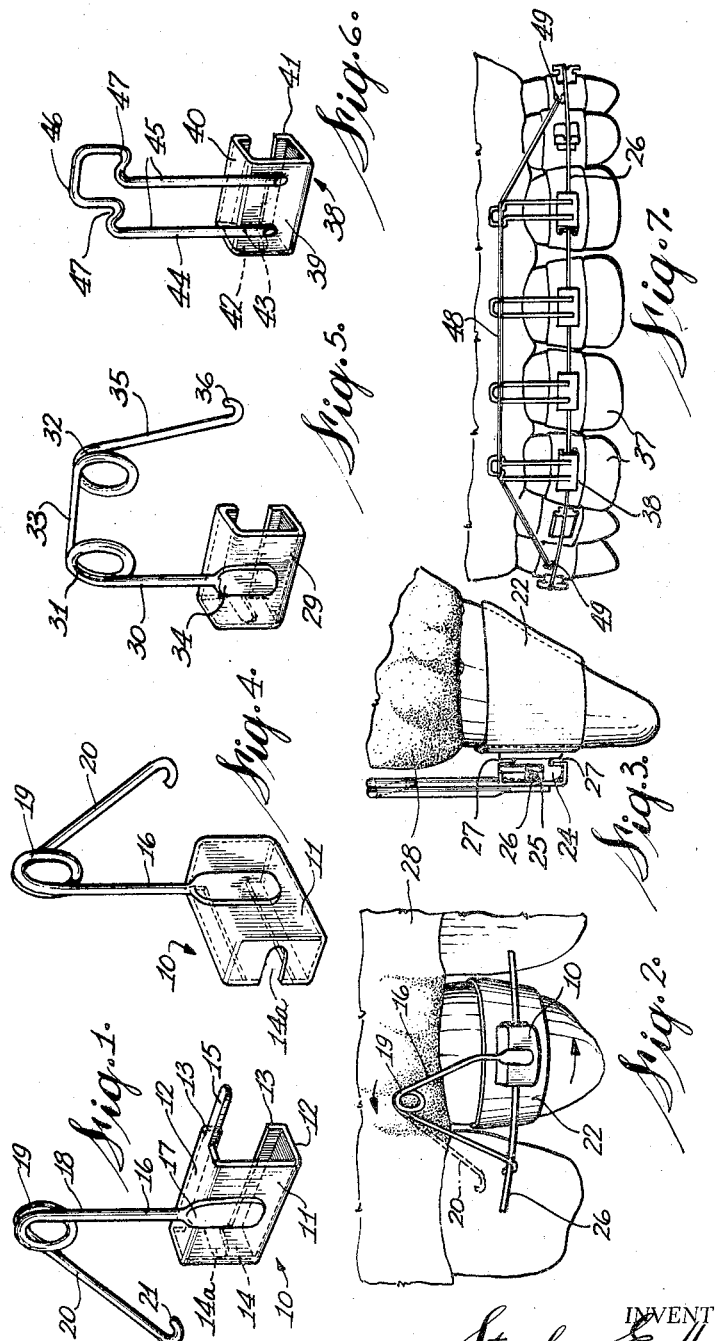
INVENTOR
Stephen E. Hegedus
BY Harold R. Weir
PATENT AGENT

United States Patent Office 3,237,305
Patented Mar. 1, 1966

3,237,305
ORTHODONTIC APPLIANCE
Steven E. Hegedus, 13 Burgar St., Welland,
Ontario, Canada
Filed May 22, 1963, Ser. No. 282,477
8 Claims. (Cl. 32—14)

This invention relates to orthodontic appliances.

In orthodontia, the conventional basic device comprises a tooth anchoring band adapted to encircle and be secured to each tooth, a bracket fixed to each tooth band, and an arch element or wire seated in slots in the brackets so as to urge the teeth toward alignment in a desired curvature. Various modifications of this basic device have been proposed in order to accomplish certain specific purposes such as the application of torque to the teeth to impart rotative movement thereto about the longitudinal axes of the teeth or the encircling tooth bands.

The problem exists, however, of providing effective means for association with the conventional orthodontic device for applying torque or distal force to individual teeth tending to displace the longitudinal axes to corrective positions.

The present invention has for an object the provision of an orthodontic attachment which is of simple and convenient manufacture, which may be readily associated with a conventional orthodontic device, and which is effective in applying torque or distal force to one or more selected teeth.

The invention will be described with reference to the accompanying drawing, in which FIGURE 1 is a perspective view of an orthodontic attachment in accordance with the invention, FIGURE 2 is a front elevation of the attachment associated with an orthodontic device, FIGURE 3 is a side elevation of the attachment in association with an orthodontic device, FIGURES 4, 5 and 6 are perspective views of modified forms of attachment in accordance with the invention, and FIGURE 7 is a front elevation showing a plurality of attachments, as illustrated in FIGURE 6, in association with an orthodontic device.

Referring to FIGURE 1, the appliance comprises a channel-shaped member 10 having a base wall 11, opposed side walls 12, and flanges 13 inwardly directed towards each other from the side walls 12. One end of the channel may be closed by an end wall 14 which is provided with a slot 14a. A tongue 15 may be provided at the other end of the channel, such tongue projecting from the end of one side wall 12.

A length 16 of spring steel wire which is elastically deformable as is well known has one end fixed to channel member 10. Preferably such end portion is flattened, as indicated at 17, and is welded or otherwise fixed to base wall 11. Wire 16 has a straight portion 18 extending perpendicularly from one side wall 12, such portion 18 including a part of flattened end portion 17 whereby any twisting or rotative moment applied to portion 18 will be effectively transmitted to the member 10.

Wire 16 also has a coiled or looped portion 19 and a second straight portion 20 which extends from looped portion 19 at an acute angle to portion 18 and terminates in a hook 21 to form an arch wire engaging means.

Referring to FIGURES 2 and 3, the elements of a conventional orthodontic device illustrated comprises a band 22 which may be cemented or otherwise secured to a tooth 23 and to which is fixed an edgewise bracket 24. The edgewise bracket has a groove 25 in its outer face to receive the arch element or wire 26 and upper and lower grooves 27 in its top and bottom faces.

In accordance with the invention, the member 10 is applied to bracket 24 by insertion of the flanges 13 in the grooves 27 and sliding the member along the bracket until the end wall 14 engages one end of the bracket. The tongue 15 may now be bent downwardly to secure the member 10 on the bracket, as shown. It will be appreciated that the dimensions of member 10 are such that it will snugly engage the contacting surfaces of the bracket. It will also be observed that slot 14a is provided to receive element 26 and permit such snug engagement.

As positioned on the bracket, the portion 18 of the wire 16 extends upwardly from the bracket (and tooth). The portion 20 extends downwardly and its hook 21 is hooked onto the element 26 for deforming the wire 16, as shown in FIGURE 2. The length of wire portion 18 (and portion 20) is such that the looped portion 19 lies somewhat above the tooth and opposite the gums 28. Such length may be, for instance, of the order of one-half inch.

Since the portion 20 of the wire normally assumes the dotted line position of FIGURE 2 and therefore when hooked over the band 26 places the wire 16 under tension, it will act to apply a distal torque force to the tooth root which, in FIGURE 2, will tend to move the tooth in the direction of the arrow, such force being applied through the engaging surfaces of the closed end 14 and the bracket. Obviously, if the tooth is to be moved in the opposite direction, an appliance acting in such opposite direction would be employed, i.e., right and left hand attachments in accordance with the invention are provided.

If the tooth 23 requires to be twisted into position, i.e., if it requires the application of torque to correct its position, this being determined by the position of the edgewise bracket 24 thereon, it will be apparent that the tension of the spring wire 16, when the attachment is positioned on such bracket as described, will act to apply torque to the tooth.

FIGURE 4 illustrates an attachment which is closely similar to that illustrated in FIGURE 1 and differs therefrom only in that the tongue 15 is omitted and the portion 20 of the spring wire 16 projects outwardly beyond the opposite or open end of the channel 10, whereas in FIGURE 1 such portion 20 extends outwardly beyond the closed end of the channel. It will be observed that, in this modification, the tension of the wire will tend to maintain the attachment in position on the bracket 24 without the use of a tongue.

FIGURE 5 illustrates a modification which employs a channel member 29 similar to that of FIGURE 4 but in which the spring wire element 30 comprises a pair of coiled sections 31 and 32 with a connecting anchor portion 35. Portion 34, fixed to the channel 29, extends perpendicularly therefrom and portion 35 with hook 36 corresponds to portion 20 of the other modifications.

The modifications thus far described are particularly suitable for the treatment of cuspid teeth.

FIGURES 6 and 7 illustrate a modification which is particularly suitable for the treatment of the anterior teeth, indicated at 37.

The channel member 38 shown is closely similar to the channel members previously described and has a base wall 39, side walls 40 and 41, flanges, and an end wall 42 closing one end of the channel, such wall 42 having a slot 43 therein receiving the arch element.

A spring wire 44 has two parallel end portions 45 fixed to base wall 39 and projecting perpendicularly from one side wall 40. The portions 45 are joined by a connecting portion 46 which has a pair of hook sections 47 therein forms the arch wire engaging means together with the elastic band 48.

In operation, the attachments are applied to the brackets 24 on the anterior teeth as shown and the elastic band 48 has its ends hooked to hooks 49 on the arch element 26 and its intermediate portion seated on the hook sections 47 of the various attachments. It will be appreciated that the band 48 is under tension in the position shown and that the degree of such tension will depend to some extent on the inherent tension of the band. The effective length of each wire 44, i.e., the distance of the hook sections 47 from the bracket 24, is of the order of one-half inch. As shown, the sections 47 are located somewhat above the juncture of the teeth and gums.

It will be apparent that, by reason of the fact that the portion of the elastic band 48 between the hook sections 47 of each pair is constrained to extend in parallel relation to the bracket 24 on the respective tooth, the band will act to apply a torque to any tooth that requires corrective treatment.

I claim:

1. In combination with an orthodontic device having a tooth band, an edgewise bracket fixed to said band, an arch wire received in a groove in a forward face of the bracket, said bracket having a pair of edge grooves, an attachment for said orthodontic device comprising a channel member mounted on the bracket having a base wall engageable with said forward face of said bracket, side walls, an end wall connected to one end of the bracket and an edge flange on each of said side walls receivable in one of said edge grooves, said walls being engaged and received on portions of the bracket and the arch wire and a spring wire having an anchored end thereof fixed to said base wall, a first portion extending from said anchored end in perpendicular relation to one of said side walls, a second portion extending from said one end of the bracket at an acute angle to said first portion and having a hooked end engageable with said arch wire, and an intermediate coiled portion on said spring wire.

2. In combination with an orthodontic device having a plurality of tooth bands, an edgewise bracket fixed to each of said tooth bands, and an arch wire engaging said brackets, a channel member having walls engaged and received on portions of the bracket and the arch wire for removable mounting on each of said brackets including an end wall preventing displacement of the mounting member in one direction relative to the bracket, and a spring wire having one end fixed to each of said channel members, said wire having a first portion extending perpendicular from said channel member in substantially parallel relation to one of said tooth bands, a second portion extending beyond said end wall of said channel member at an acute angle to said first portion and having a hooked end engageable with said arch wire, and an intermediate coiled portion on said spring wire.

3. In combination with an orthodontic device having a plurality of tooth bands, an edgewise bracket fixed to each of said tooth bands, and an arch wire engaging said brackets, a channel member removably mounted on each of said brackets and a spring wire having substantially parallel spaced end portions fixed to said bracket and extending from said channel member in substantially parallel relation to the axis of one of said tooth bands, a hook section surmounting each of said end portions, and an intermediate portion joining said hook sections, and an elastic band having ends connected to said arch wire and an intermediate portion engaged with said hook sections.

4. In combination with an orthodontic device having a plurality of tooth anchoring bands, mounting brackets connected to said bands and arch means engageable with the brackets for exerting forces on the bands tending to align the axes thereof along a desired curvature, an attachment comprising a mounting member slidably received on at least one of said brackets having means for preventing displacement of the mounting member in one direction relative to the bracket, elastically deformed means fixedly mounted on said mounting member, and engaging means on said deformed means in engagement with the arch means tending to displace the mounting member in said one direction relative to the bracket for imposing torsional stress on the tooth band, whereby the axis of the tooth band will be displaced toward a corrective position on the curvature with which the band is being aligned.

5. The combination of claim 4 wherein said elastically deformed means comprises an elongated spring member extending from the arch means substantially parallel to said axis of the band, said engaging means including a hook formation on the spring member.

6. The combination of claim 5 wherein said spring member includes an anchor portion fixedly secured to the mounting member adjacent the arch means, a coil portion remote from the arch means and straight sections interconnecting the coil portion with the anchor portion and the hook formation.

7. The combination of claim 4, wherein said engaging means comprises a hook formation on the deformed means remote from the arch means, and a flexible band anchored at spaced locations to the arch means in engagement with said hook formation.

8. In combination with an orthodontic device having a plurality of tooth anchoring bands, mounting brackets connected to said bands and an arch wire engaged with the bracket for exerting forces on the bands tending to align the axes thereof along a desired curvature, an attachment comprising a mounting member received on at least one of said brackets, elastically deformed means fixedly mounted on said mounting member adjacent to the arch wire, and engaging means on said deformed means in engagement with the arch wire in spaced relation to said tooth band for imposing torsional stress thereon tending to displace the axis thereof toward a corrective position on the curvature with which the band is aligned, said bracket having grooves, said mounting member comprising a channel element having spaced side walls interconnected by a base wall from which the deformed means extends, one end of the channel element being closed by an end wall having a slot through which the arch element extends, said channel element being slidably received on the bracket through an open end opposite to said one end closed by the end wall, and flanges extending toward each other from the side walls slidably received in said grooves formed in the bracket to slidably mount the channel element.

References Cited by the Examiner

UNITED STATES PATENTS

| 1,304,722 | 5/1919 | Young | 32—14 |
| 1,304,723 | 5/1919 | Young | 32—14 |
| 1,369,665 | 2/1921 | Johnson | 32—14 |
| 1,821,171 | 9/1931 | Atkinson | 32—14 |
| 3,028,671 | 4/1962 | Berger | 32—14 |
| 3,043,006 | 7/1962 | Wallshein | 32—14 |
| 3,091,857 | 6/1963 | Rubin et al. | 32—14 |
| 3,093,903 | 6/1963 | Kesling | 32—14 |

RICHARD A. GAUDET, *Primary Examiner.*